United States Patent [19]
Wilson

[11] Patent Number: 4,922,581
[45] Date of Patent: May 8, 1990

[54] BRAIDED EYEGLASS RETAINER AND WRISTBAND

[76] Inventor: Joey A. Wilson, 26575 Via Cuervo, Mission Viejo, Calif. 92691

[21] Appl. No.: 354,621

[22] Filed: May 19, 1989

Related U.S. Application Data

[62] Division of Ser. No. 293,308, Jan. 4, 1989.

[51] Int. Cl.⁵ .................................................. G02C 3/00
[52] U.S. Cl. .......................................... 24/3 C; 24/300
[58] Field of Search ............... 428/12; 24/265 A, 3 C, 24/300, 301, 3 B, 3 G, 3 M, 9; 351/123, 157, 156

[56] References Cited

U.S. PATENT DOCUMENTS

| | | | |
|---|---|---|---|
| 536,965 | 4/1895 | Neuberger | 24/265 A |
| 2,264,351 | 12/1941 | Willson | 351/156 X |
| 2,660,092 | 11/1953 | Bloom | 351/157 X |
| 3,190,086 | 6/1965 | Klein | 428/12 |
| 3,874,776 | 4/1975 | Seron | 351/156 X |
| 4,133,604 | 1/1979 | Fuller | 351/126 X |
| 4,827,790 | 8/1974 | Wenzel | 24/3 C X |
| 4,879,804 | 4/1975 | Lawrence | 24/3 C |

*Primary Examiner*—James R. Brittain
*Attorney, Agent, or Firm*—Stetina and Brunda

[57] ABSTRACT

A braided eyeglass retainer and wristband is disclosed characterized by a strap portion being formed from a plurality of interbraided elongate members adapted to moderately stretch upon encountering an axial tension force and provide an aesthetically pleasing external configuration.

3 Claims, 1 Drawing Sheet

BRAIDED EYEGLASS RETAINER AND WRISTBAND

This application is a division of application Ser. No. 07/293,308, filed 1/4/89, pending.

FIELD OF THE INVENTION

The present invention relates generally to straps or bands worn on the body and more particularly to a device and construction for forming an eyeglass retainer or wrist band.

BACKGROUND OF THE INVENTION

As is well known, eyeglass retainers typically in the form of a neck strap affixed to the temple members of a pair of eyeglasses are commonly used wherein the neck strap is typically worn over the back of the wearer's neck, thereby serving to prevent the loss or damage of the eyeglasses. Heretofore the construction and materials used in the neck strap portion of such prior art devices has limited the capacity of the neck strap to elastically stretch along its length by only a small amount, or not at all, without breaking. Oftentimes, when the wearer engages in rigorous physical activity such as water skiing or surfing, the eyeglasses can be jarred or otherwise pulled away from the wearer, in which case these prior art devices will often break due to applied tension against the wearer's neck, sometimes resulting in loss or damage to the eyeglasses, or even occasional injury to the wearer. A few prior art devices alleviate this problem to a limited extent. For example, in U.S. Pat. No. 3,879,804 issued to Lawrence, an eyeglass neck strap is formed from a synthetic resinous material having a durometer value ranging from 65 to 85 for the purpose of improving durability and ease of attachment. While the elastic properties of this device somewhat alleviate the breakage and safety problems noted above, it has been found that an eyeglass retaining device having greater elastic resilience is needed to adequately avoid these problems, particularly when the wearer engages in vigorous physical activity.

Another limitation of many prior art eyeglass retaining devices is their lack of resistance to water damage. This particularly limits their use when the wearer engages in water sports. In view of the above noted durability and safety problems associated with these prior art devices, their exists a substantial need in the art for an eyeglass retaining device which has enhanced elastic stretchability and durability as well as greater resistance to water damage.

SUMMARY OF THE INVENTION

The present invention specifically addresses and alleviates the above referenced deficiencies in the art by providing an eyeglass retainer having a neck strap portion formed by interbraiding plural elongate members cut from fabric coated neoprene, such as that typically used in wetsuit applications, whereby the braided construction coupled with the elastic properties of the elongate members provide enhanced elastic stretchability and durability, as well as improved aesthetics and resistance to water damage. Being so formed from plural separate braided members, the strap member can optionally be made to be attractively multicolored.

In a second embodiment, this braided fabric coated neoprene construction of the present invention is applied to form a "surf bracelet" also having the stretchability, durability and water damage resistant properties of the eyeglass retaininer of the present invention.

DESCRIPTION OF THE DRAWINGS

These and other features of the present invention will become more apparent upon reference to the drawings wherein.

DESCRIPTION OF THE PREFERRED EMBODIMENTS

Figure 1:
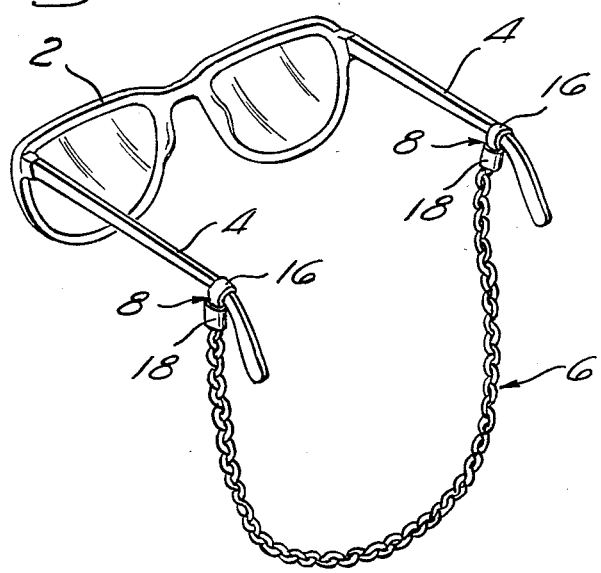
FIG. 1 is a perspective view showing the eyeglass retainer of the present invention installed on a pair of eyeglasses.
Figure 2:
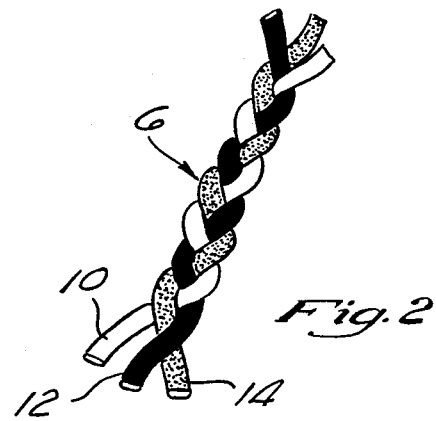
FIG. 2 is a detail view illustrating the interbraided construction of the strap portion of the present invention.

Referring to FIG. 1, there is shown the braided eyeglass retainer device of the first embodiment of the present invention comprising generally a strap member 6 affixed at its distal ends by retaining means 8 to the temple members 4 of a conventional pair of eyeglasses 2. The strap member 6 is of composite construction preferrably formed by interbraiding three elongate members 10, 12, 14 as shown in FIG. 2 (elongate members 10, 12 and 14 are shaded black, speckled and white, respectively, in FIG. 2 to illustrate the interbraided construction). Although for purposes of illustration three members 10, 12 and 14 are depicted, those skilled in the art will recognize the the invention may be practiced with any plural number of elongate members. Each elongate member 10, 12, 14 is formed by cutting a piece of fabric coated neoprene, such as that typically utilized in wetsuit applications, into an elongate strip of preferrably uniform width, the resulting elongate strip having a rectangular cross section with the two outer fabric laminae of the coated neoprene constituting the surfaces forming the upper side and underside and the inner neoprene lamina exposed by the cut constituting the surfaces forming the narrower lateral sides thereof. As shown in FIG. 2, the strap member 6 is formed by braiding together elongate members 10, 12, 14 wherein, after placing the elongate members parallel to one another and in distally aligned registry, a distal portion of the first elongate member 10 is passed laterally or transversely over second elongate member 12. Third elongate member 14 is then passed transversely under second elongate member 12 and then transversely over first elongate member 10 with the lateral side thereof abutting the proximal side of the juncture formed by the cross over of first and second elongate members 10 and 12. Moving proximally, first elongate member 10 is then passed transversely under third elongate member 14 and then transversely over second elongate member 12 with the lateral side thereof abutting the proximal side of the juncture formed by the cross over of second and third elongate members 12 and 14. This procedure is repeated along the remainder of the length of the elongate members until the interbraided composite construction of the strap member 6 is completed.

Figure 3:
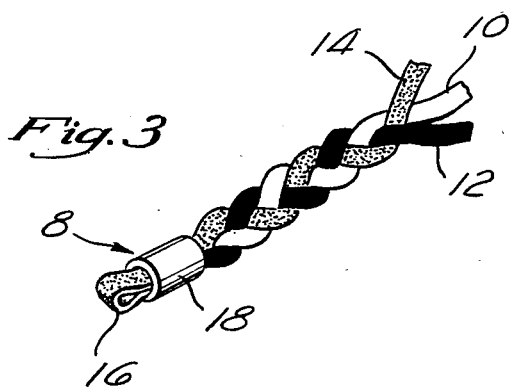
FIG. 3 is a detail view illustrating the retaining means of the eyeglass retainer of the present invention.

With the body of the strap member 6 so formed, the retaining means 8 at each distal end of the strap member 6 is constructed as shown in FIG. 3, wherein a length is cut from the distally unbraided ends of first and third elongate members 10 and 14 leaving the second elongate member 12 distally extended to be turned over forming a loop 16 which is in turn is slidably inserted along with the distally shortened ends of elongate members 10 and 14 through the eye of tubular retaining member 18, thereby forming retaining means 8 and completing the construction of the eyeglass retainer embodiment of the present invention. Retaining member 18 is preferably made of ductile, corrosion resistant metal for reasons that will be clarified below.

The eyeglass retainer of the present invention is installed on a pair of eyeglasses as shown in FIG. 1 by slidably inserting the distal end of each eyeglass temple member 4 into the eye of a loop 16 of the eyeglass retainer of the present invention until the retaining means 8 is positioned near the juncture between the earpiece and shaft of the temple member 4. The eyeglass retainer of the present invention is then secured to the eyeglass temple members 4 simply by crimping or laterally compressing and plastically deforming each retaining member 18 on two circumferentially opposite sides using a pair of pliers or other suitable means until the loop 16 and the distal ends of elongate members 10 and 14 are sufficiently compressed within the flattened eye of each retaining member 18 such that frictional engagement with the sides thereof prevents them from sliding therewithin and thereby securely affixes loops 16 to the eyeglass temple members 4.

From the above, it will be recognized that the eyeglass retainer of the present invention comprises a simple construction from materials which are inexpensive and readily available. It will be further recognized that the construction using braided strips of elastically deformable fabric coated neoprene results in an eyeglass retainer strap having elastic stretchability greater than that of the invdividual elongate strips due to the braided construction coupled with the lateral poisson contraction (poisson contraction being the tendency of a body experiencing axial stretching to undergo an attendant reduction in cross sectional area) of the individual strips when the composite strap is stretched. Still further, it will be recognized that by use of the same fabric coated neoprene material typically utilized in wetsuits, the eyeglass retainer of the present invention has excellent resistance to water damage.

Figure 4:
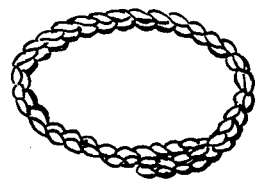
FIG. 4 is a perspective view of the wrist bracelet embodiment of the present invention.
Figure 5:
FIG. 5 is a detail view illustrating the connected ends of the wrist bracelet embodiment of the present invention.

Referring now to FIG. 4, an additional embodiment of the present invention is disclosed in which the same braided construction using three elongate strips cut from fabric coated neoprene is used to form what is known as a "surf bracelet", in which the distal ends of the braided strap are brought together and overlapped (as depicted in FIG. 5), wherein the overlapped portions are then stitched together with a water resistant stitching or alternatively crimped together using a device such as the retaining member 18 of FIG. 3. It will be recognized that this bracelet embodiment of the present invention also possesses the same elastic stretchability/durability and water damage resistant properties as the eyeglass retainer embodiment of the present invention.

It can be understood that because the strap member of both the eyeglass retainer and surf bracelet embodiments of the present invention is formed from three separate elongate members, it is possible to make the strap member attractively multicolored simply by cutting the elongate members from different colored pieces of fabric coated neoprene.

Although the present invention has been described herein with reference to specific design configurations, methods of construction and materials, those skilled in the art will recognize that modifications to the same can be made without departing from the spirit of the present invention and such modifications are contemplated herein.

What is claimed is:

1. An eyeglass retainer for preventing a pair of eyeglasses from being accidentally disattached from the body of the wearer comprising:
    a strap portion formed from a plurality of interbraided elongate members; and
    retaining means for affixing said eyeglass retainer to said eyeglasses;
    wherein each of said elongate members is comprised of an elastic material capable of lateral poisson contraction when stretched along its length, said interbraiding coupled with said lateral contractability acting to give said strap portion an elastic stretchability along its length greater than that of said individual elongate members, said elastic material being composed of a fabric coated neoprene, and wherein said retaining means is integrally formed at each end of said strap portion, said integrally formed retaining means comprising a loop portion formed from a turned back distal end of one of said elongate members and a crimp connector sized to secure said loop portion to said strap member, said loop portion being sized to laterally deform to receive the temple member of the eyeglasses therethrough and thereafter contract to frictionally engage the temple member of the eyeglasses and affix the eyeglasses to the strap portion.

2. The eyeglass retainer of claim 1 wherein said elastic material is also resistant to water damage.

3. The eyeglass retainer of claim 1 wherein at least one of said plurality of elongate members is of a color different than that of at least one other of said elongate members.

* * * * *